Figure 1:
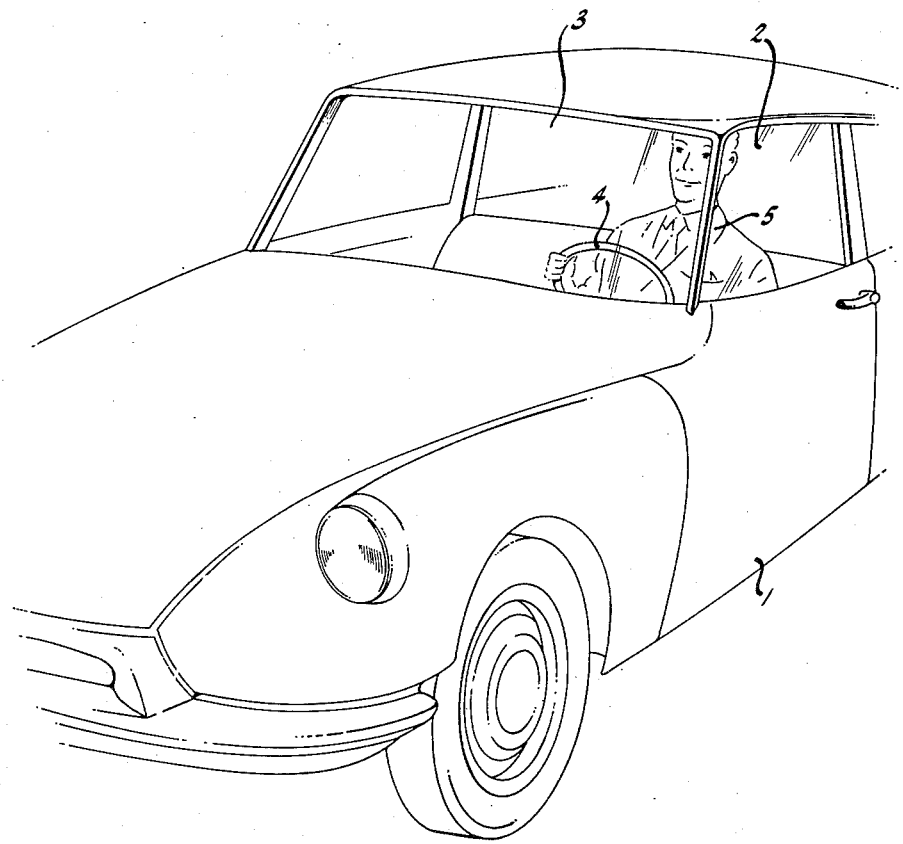

June 12, 1962  A. F. HEIMER  3,038,756
WINDOW ARRANGEMENTS, PARTICULARLY FOR ENGINE DRIVEN VEHICLES
Filed Oct. 22, 1959  2 Sheets-Sheet 1

INVENTOR.
ALF FOLKE HEIMER
BY
*Lippincott & Ralls*
ATTORNEYS

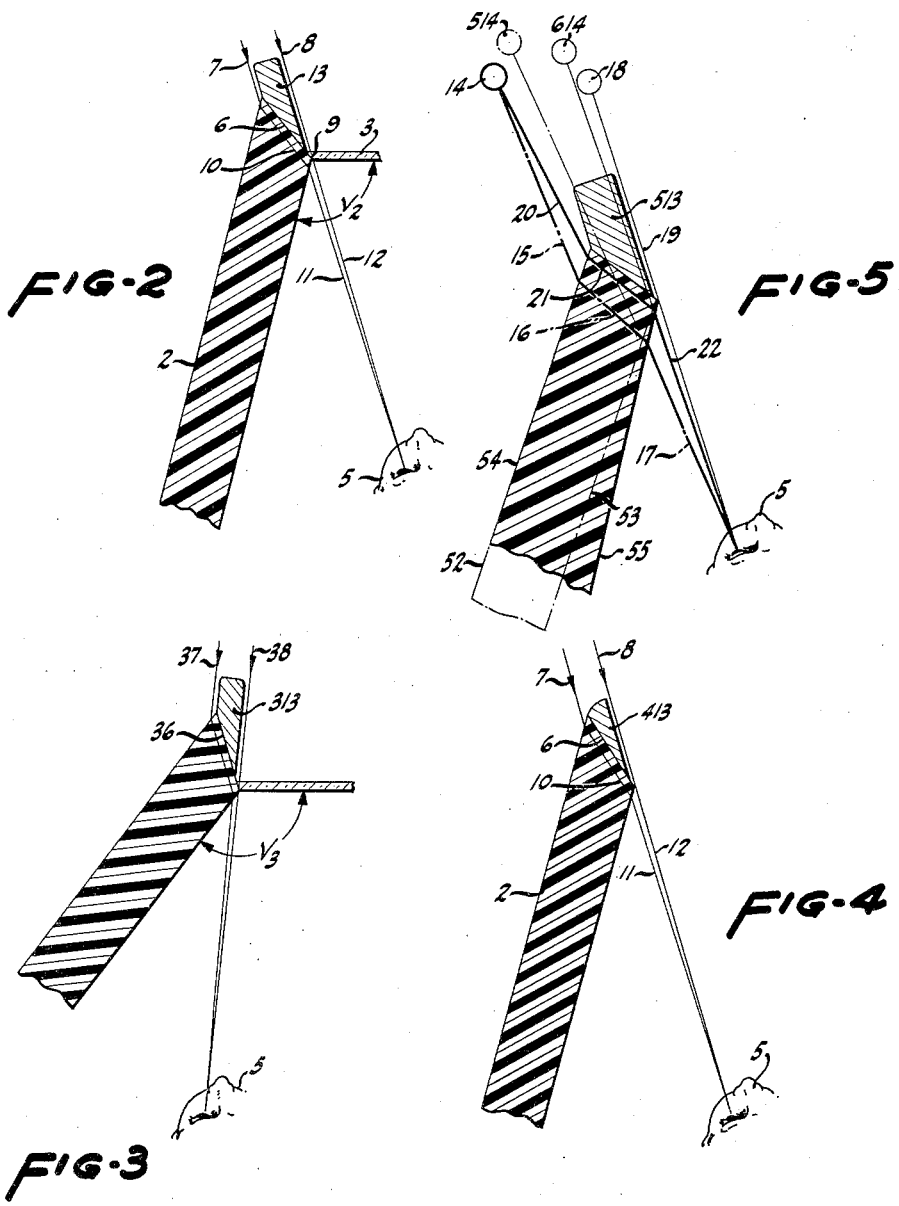

United States Patent Office 3,038,756
Patented June 12, 1962

3,038,756
WINDOW ARRANGEMENTS, PARTICULARLY FOR ENGINE DRIVEN VEHICLES
Alf Folke Heimer, Malmgrensgatan 10,
Goteborg S, Sweden
Filed Oct. 22, 1959, Ser. No. 848,082
Claims priority, application Sweden Oct. 27, 1958
7 Claims. (Cl. 296—44)

The present invention relates to window arrangements, particularly adapted for engine driven vehicles, and comprising at least two adjacent windows forming an angle with one another. It has been proposed to arrange the transition region between abutting windows in such a way that any edges of panes or of wind-screens and any supports fall within a dead space tapering towards the observer's or operator's place, as the case may be, the idea being to avoid an annoying picture of said parts coming into the operator's sight. This has not been successful as in most cases there still remains a dark edge-like image.

The present invention has for its object to avoid this optical disturbance and to make sure that said dead space with the contents thereof is quite invisible to the operator, even at comparatively large angles between adjacent windows, so that the operator may concentrate his attention on the road and the surroundings thereof.

To realize the invention the window arrangement is such that the operator's place is closer to the one of two adjacent windows than to the other one and that said closer window is covered by a transparent pane having an obliquely cut edge constituting the one boundary of the dead space, a secondary boundary facing the second window being constituted by the path of an unbroken light ray in traversing the second window being tangent to the edge of the first window and extending to the operator's place.

The invention will be more closely described with reference to the accompanying drawings on which FIG. 1 is a perspective view of a motor car, on which the invention has been applied, FIGS. 2, 3 and 4 are horizontal sections through the windows according to different embodiments, and FIG. 5 is a horizontal section on an enlarged scale of a further modification.

In the motor car 1 there is provided a lateral window and a front window which, in the shown embodiment, are covered by transparent panes 2 and 3 of glass or a substitute therefor, such as plastic. The steering-wheel 4 is assumed to be at the left and the driver's place 5 will thus be closer to the pane 2 than to the pane 3 which latter in this case will serve as the wind-screen.

In the horizontal section of FIG. 2 the left hand window is covered by the rather thick transparent plastic pane 2, the front edge of which is obliquely cut at 6, forming an acute-angle corner with the outside surface of pane 2 and an obtuse-angle corner with the inside surface of pane 2 as shown in the drawing. The front window is here assumed to be covered by the wind-pane 3 having a thickness which is but a small fraction of that of the lateral pane 2. Two parallel rays of light 7 and 8 incoming adjacent the joint between the panes 2 and 3 will then trace the following paths. The ray 7 hits the pane 2 and is refracted according to the laws of optics along line 10 to the ray 11 entering the cabin and extending to the observer at 5. As shown, edge 6 is parallel to the path 10 through the pane of this light ray that passes immediately behind the obtuse-angle corner between edge 6 and the inside surface of pane 2. The second ray 8 will traverse the thin pane 3 practically unbroken close at the point of junction 9 and continue along line 12 to the observer at 5, passing immediately in front of the obtuse-angle corner between edge 6 and the inside surface of pane 2. According to laws of optics the lines 11 and 12 are parallel although they are drawn somewhat separated but converging for the sake of clarity. For purposes of explanation, it can be noted from well-known elementary optical principles that the paths of light rays traveling inward to the operator are identical to the paths that would be followed by light rays traveling outward from a source located at the operators' position. A wedge-shaped, dead space, invisible from the operator's position, is restricted, on the one side, by the obliquely cut edge 6 and, on the other side, by the path of the ray 8, which, as is evident from the drawings, defines a plane extending forward from the obtuse-angle corner between edge 6 and the inside surface of pane 2, at an acute angle to edge 6. This dead space is used in this case to accommodate an opaque support 13, the section of which must nowhere extend beyond said boundaries, if complete invisibility of the support from the operator's position is to be achieved. As far as the support 13 extends beyond the pane 2 it must also not extend to the left hand side of the incoming ray 7. The observer at 5 gets thus the impression that both rays 7 and 8 originate from the same source and he is unable to see the support 13 or any edges of the panes 2 and 3 forming the joint in the transition region between the two panes. Within said dead space the support 13 may have any kind of section.

In FIG. 3 it is indicated how the arrangement may be modified if the angle $V_2$ of FIG. 2 between the panes is increased to a value $V_3$. The rays 37 and 38 will hereby come from another direction so that it will be necessary to give to the oblique edge 36 and the dead space together with the support 313 a somewhat different configuration and direction as indicated in FIG. 3.

From FIG. 4 is is understood that the wind pane 3 proper as shown in FIG. 2 may be entirely left out in which case the lateral pane 2 may be made in the same way as in FIG. 2. The same is valid in respect also of the oblique edge 6, the two rays 7 and 8 with their extensions 10, 11 and 12. Also in FIG. 4 the dead space has the same extension as in FIG. 2 but a support 413 has here been shown with another section within the dead space given.

Particularly in the case of large angles V between the two windows it may occur that the dead space will be too narrow to allow for the necessary size of the support between the panes. In FIG. 5 it is indicated how this difficulty may be avoided. A pane having plane parallel sides 52 and 53 is shown, the latter side being drawn in dash and dot lines. From an object 14, such as a pole, there is issued a ray along the dash and dot line 15, which traverses the pane on the refractory line 16 and hits the observer on the dash and dot line 17. The driver gets then the impression that the object is positioned at the virtual position 514. Another object 18 being to the right of the object 14 issues an unbroken ray 19 directly to the observer. As the rays 17 and 19 here form a considerable angle with one another the dead space may apparently not be extended to the line 15. In FIG. 5 there is also shown in full lines a pane having the plane sides 54 and 55 forming an angle between one another in such a way that the pane will be somewhat narrower towards its edge facing the adjacent window. On the drawing the angle between the sides 54 and 55 of the pane is exaggerated. In reality it is an angle corresponding to an angular coefficient of 1:500, i.e. an angle being a fraction of 1°. In practice angles corresponding to more than a value of 1:100, i.e. about ½°, are of no use. Through this tapering of the pane the refractory conditions will be different. The observer will now get the impression that the object 14 is positioned in a virtual point 614 due to the fact that a ray of light from the object now passes along the full lines 20, 21 and 22 to the observer at 5. In reality the rays 19 and 22 will coincide entirely so that a dead space is obtained between the paths of the rays 20, 21 and 19 within which a support 513 of any arbitrary section may be mounted without the driver being able to observe anything from his place at 5 neither of the boundaries of the dead space nor of any support within this space. There will be a small error in the image of the surroundings caused by the offset of the image of the object 14 to the proximity of the object 18, but this will be without any practical importance during the driving.

It is evident that the present invention may be principally applied even if the steering-wheel and the driver's place will be at the right instead of at the left in which case the sections in FIGS. 2 to 5 will be converted into mirror images of the present drawing.

Above the invention has been described with reference to motor cars. It is clear that it is within the scope of the invention to provide the corresponding window arrangements in tractors, digging machines and caterpillars as well as in operating cages for traverses and hoists.

What is claimed is:

1. A window arrangement for a vehicle having an operator's place, comprising means defining first and second window openings arranged in different planes intersecting along a common boundary ahead of said operator's place, the plane of said first opening extending closer to the operator's place than said second opening, a transparent pane filling said first opening, and an opaque structure dividing said window openings at said common boundary and supporting the forward edge of said pane, said structure being contained within the boundaries of a zone invisible at said operator's place, said boundaries being defined by that portion of a straight line which extends forward from and tangent to the inner, forward edge of said pane from said operator's place and by that portion of the path of a light ray which passes through said pane after striking the inner, forward edge of said pane from a source at said operator's place, whereby said opaque structure is invisible and there is a substantially unbroken view at said operator's place.

2. The window arrangement of claim 1, additionally comprising a transparent pane filling said second opening and supported at one edge by said opaque structure.

3. The window arrangement as in claim 2, the pane filling said first window opening having parallel sides and being thicker than the pane filling said second window opening.

4. The window arrangement as in claim 2, the pane filling said first window opening having a thickness which decreases in a direction towards said opaque structure.

5. A window arrangement for vehicles, comprising a transparent pane having outer and inner surfaces, said pane having an edge forming an acute-angle corner with said outer surface and an obtuse-angle corner with said inner surface, and an opaque support substantially contained within a wedge-shaped space bounded by said edge and a plane extending from said obtuse-angle corner at an acute angle to said edge.

6. A window arrangement for a vehicle having an operator's place, comprising a transparent side window pane extending alongside said operator's place, said pane having substantially parallel outer and inner surfaces, said pane having a front edge forming an acute-angle corner with said outer surface and an obtuse-angle corner with said inner surface, and an opaque support substantially contained within a wedge-shaped space bounded by said edge and a plane extending forward from said obtuse-angle corner in the direction of a straight line between said obtuse-angle corner and the operator's place.

7. A window arrangement for a vehicle having an operator's place, comprising a transparent side window pane extending alongside said operator's place, said pane having outer and inner surfaces parallel to each other within one-half degree, said pane having an obliquely disposed front edge forming an acute-angle corner with said outer surface and an obtuse-angle corner with said inner surface, said edge being parallel to the paths within said pane of light rays that pass immediately behind said obtuse-angle corner and continue to said operator's place, and an opaque support substantially contained within a wedge-shaped space bounded by said edge and a plane extending forward from said obtuse-angle corner at an acute angle to said edge, said plane being parallel to the paths of light rays that pass immediately in front of said obtuse-angle corner and continue to said operator's place.

References Cited in the file of this patent

UNITED STATES PATENTS

| 869,236 | Feinberg | Oct. 29, 1907 |
|---|---|---|
| 975,150 | Murnane | Nov. 8, 1910 |
| 1,678,479 | Patten | July 24, 1928 |
| 2,043,756 | Lalancette | June 9, 1936 |
| 2,326,789 | Marine | Aug. 17, 1943 |

FOREIGN PATENTS

| 616,635 | Germany | Aug. 2, 1935 |